(12) United States Patent
Gehring et al.

(10) Patent No.: US 6,625,664 B2
(45) Date of Patent: Sep. 23, 2003

(54) AUTOMATION SYSTEM TO ACCESS FUNCTIONALITY OF HARDWARE COMPONENTS WITH EACH HARDWARE COMPONENT HAVING SYSTEM CONNECTION UNIT WITH FUNCTION OBJECTS REPRESENTING REAL FUNCTIONALITY OF COMPONENTS

(75) Inventors: Hubert Gehring, Nuernberg (DE); Horst Koerzdoerfer, Erlangen (DE); Thomas Talanis, Heroldsbach (DE); Thomas Zebisch, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 191 days.

(21) Appl. No.: 09/846,395

(22) Filed: May 2, 2001

(65) Prior Publication Data

US 2001/0052041 A1 Dec. 13, 2001

Related U.S. Application Data

(63) Continuation of application No. PCT/DE99/03364, filed on Oct. 20, 1999.

(30) Foreign Application Priority Data

Nov. 2, 1998 (DE) .......................... 198 50 469

(51) Int. Cl.$^7$ .......................... G06F 13/14; G06F 13/20
(52) U.S. Cl. .................. 710/2; 710/9; 710/36; 709/311; 709/315; 709/316
(58) Field of Search .................. 710/2, 9, 36; 709/311, 709/315, 316

(56) References Cited

U.S. PATENT DOCUMENTS 5,805,442 A     9/1998   Crater et al. ................ 364/138
6,151,700 A  *  11/2000  Fox ............................. 717/107
6,304,918 B1 * 10/2001  Fraley et al. ................ 709/322
6,442,640 B1 *  8/2002  Eby et al. .................... 710/305

FOREIGN PATENT DOCUMENTS

| EP | 0 488 178 | 6/1992 | ............ H04Q/9/00 |
| EP | 0 825 740 | 2/1998 | ............ H04L/12/28 |
| WO | 97/16771 | 5/1997 | ............ G03G/21/14 |
| WO | 97/39393 | 10/1997 | ........... G05B/19/418 |
| WO | 97/49028 | 12/1997 | ........... G06F/9/445 |

OTHER PUBLICATIONS

Schmoll J: "Wird OLE For Process Control (OPC) ein neuer Industriestandard?" *Automatisierungstechnische Praxis – ATP*, DE, Oldenbourg Verlag. Munich, vol. 39, Nr. 5 (May 1997), Pp. 11–12m 14–17.

Clip, P. "DCOM: Microsoft Enhances DCE", *Byte*, US, Mcgraw–Hill Inc., St. Peterborough, vol. 23, Nr. 3 (Mar. 1988), pp. 47–48.

* cited by examiner

Primary Examiner—Rehana Perveen
(74) Attorney, Agent, or Firm—Sughrue Mion, PLLC

(57) ABSTRACT

An automation system 1, and a method for accessing the functionality of hardware components H1 . . . Hn of the automation system. Hardware components are connected by at least one bus system B1 . . . B3, and at least one hardware component contains a system connection unit 5. The system connection unit eliminates the need for special transmission objects, which until now were required between an administrative system and the hardware components of an automation system. The system connection unit contains function objects D1 . . . DB as images of the real functionality of the hardware components, whereby the function objects are provided for accessing the functionality of the hardware components via the bus system. The function objects are designed, for example, as DCOM objects.

17 Claims, 2 Drawing Sheets

AUTOMATION SYSTEM TO ACCESS FUNCTIONALITY OF HARDWARE COMPONENTS WITH EACH HARDWARE COMPONENT HAVING SYSTEM CONNECTION UNIT WITH FUNCTION OBJECTS REPRESENTING REAL FUNCTIONALITY OF COMPONENTS

This is a Continuation of International Application PCT/DE99/03364, with an international filing date of Oct. 20, 1999, which was published under PCT Article 21(2) in German, and the disclosure of which is incorporated into this application by reference.

FIELD OF AND BACKGROUND OF THE INVENTION

The present invention relates to an automation system, and more particularly to an automation system including hardware components linked via at least one bus system, and a method for accessing the functionality of the hardware components.

As an example, such an automation system may include motors, sensors, actuators, etc., which form an automatic production process in conjunction with one or more superordinate control devices. Activating the hardware components normally requires the use of a special abstraction layer connected between the control devices and the hardware components, which transmits control commands between the control device and the hardware components. Thus, when replacing or upgrading the hardware components of the automation system, aside from changing the hardware components themselves, it is also usually necessary to change or adapt the control device as well, e.g., by replacing a control program in the control device that communicates with the newly replaced hardware component.

As background, WO-97/16771 describes a universal bus system used for communication purposes in a printing or copy machine, whereby each functional unit of the device is connected to the bus system via an interface, and each interface is preferably equipped with a storage unit, in which data and information assigned to certain functional units can be stored.

A private bus system for controlling household devices is described in EP-0488178A2. In this reference, room surveillance devices, to which electrical devices are connected, are connected to a central viewing control device, from which the user can control the household devices, via the private bus system.

EP-0825740A2 describes a circuit arrangement that enables the connection of various different household devices as well as devices that are not permanently installed, in a manner that does not require manually inputting commands to initiate an activation or an effect-integration of the devices in the system.

Further, WO 97/39393 discloses that it can be useful to arrange a communications bus in between individual network-based controllers (NBC), as well between NBCs operated at different locations, in order to control and process data within an industrial system. With this configuration, data packages can be exchanged directly between the NBCs. Direct access to the storage areas of another NBC is also possible.

From Schmol J., Wird OLE FOR PROCESS CONTROL, Ein Neuer Industrie Standard? [Will OLE for Process Control (OPC) Become a New Industry Standard?], ATP 39, No. 5, pages 11–12, it is known that, on the basis of Windows based technology of, inter alia, DCOM, it is possible to use the "OLE for Process Control" (OPC) specification to provide a uniform method of access and a uniform interface between user programs from the industrial sector and the office sector on the one hand, and other user programs of the automation level, such as automation systems, field devices, etc. on the other hand.

OBJECTS AND SUMMARY OF THE INVENTION

Notwithstanding the disclosures above, the present invention is based on including a component directly in the hardware components, through which function objects can be executed to access the functionality of the hardware components. This component is created in the form of a system connection unit of the present invention. The system connection unit is connected to a bus system of the automation system of the present invention, so that communication data can be transmitted from a main system to a hardware component, as well as to and from all other components linked to the bus system. Therefore, the system connection unit of the present invention eliminates the need for special transmission objects, which until now were required between an administrative system and the hardware components. In addition to eliminating such transmission objects, which can be either hardware or software components, there is also a decrease in the communication error rate, since the system connection unit is essentially based on software components. This allows the configuration of the automation system to be ascertained when replacing a hardware component or, even during the operation of the system. Moreover, there is always a direct connection to the functionality of the hardware components via the system connection unit.

One object of the present invention is to provide an operating automation system which allows for replacement of hardware components without having to functionally change the automation system.

Another object of the present invention is to provide an operating automation system which eliminates the need for special transmission objects, which until now were required between an administrative system and the hardware components of the automation system.

Yet another object of the present invention is to provide a method for accessing the functionality of hardware components of an automation system.

These and other objects are solved by providing an automation system with at least one bus connecting hardware components of the automation system. At least one of the hardware components contains a system connection unit. The system connection unit has a common interface containing a pre-defined identification for each of the hardware components, and is used for communication with an external communication partner, and for receiving and transmitting information. Further, the system communication unit includes at least one function object based on a software object as an image of a real functionality of the hardware components, whereby the function object is provided for accessing the real functionality of the hardware components via the bus system.

It is envisioned that the hardware components of the present automation system can include, among other devices, motors, sensors, and actuators. In addition, the automation system of the present invention can include an administrative system and an operating and monitoring system for accessing the function objects. The function objects of the present invention can be designed as DCOM objects, and each function object can include at least one first function object for producing a minimal functionality of one of the hardware components, at least one second function object for connecting function objects, and at least one third function object for gathering function objects located in the system processing unit and/or on remote system processing units and/or on remote computers.

Further, function objects of the present invention can be designed using DCOM (Distributed Component Object Model). DCOM is a mechanism that makes it possible to run applications distributed throughout several computers in a network. In this context, a distributed application may consist of several processes that work together to perform a task. These processes can be executed on one or several computers or system connection units. In addition, a linking object can be created by providing the second function object for influencing connections between the function objects located on remote system connection units and/or remote computers.

Also in the present invention, trouble-free access to the hardware components, without the necessity of synchronization measures, can be guaranteed in that a dynamic retrieval object is generated by the third function object when the system connection unit is accessed. The special feature of this retrieval object is to enumerate the sum of the system's functionality. Finally, the automation system of the present invention further includes a loadable table with encoding rules, thereby ensuring a simple and effective method of providing encoding methods. This produces a so-called marshalling function of the function objects.

In a method of the present invention for accessing the functionality of hardware components of an automation system, the hardware components are connected via at least one bus system, and an identification of the hardware components is pre-defined and stored in at least one system connection unit. The system connection unit communicates with an external communication partner, and the functionality of the hardware components are accessed using function objects as images of real hardware functions.

BRIEF DESCRIPTION OF THE DRAWINGS

The above-mentioned features and advantages of this invention, and the manner of attaining them, will become more apparent and the invention will be better understood by reference to the following description of the present invention taken in conjunction with the accompanying drawings, wherein.

DETAILED DESCRIPTION OF THE PREFERRED EMBODIMENTS

Figure 1:
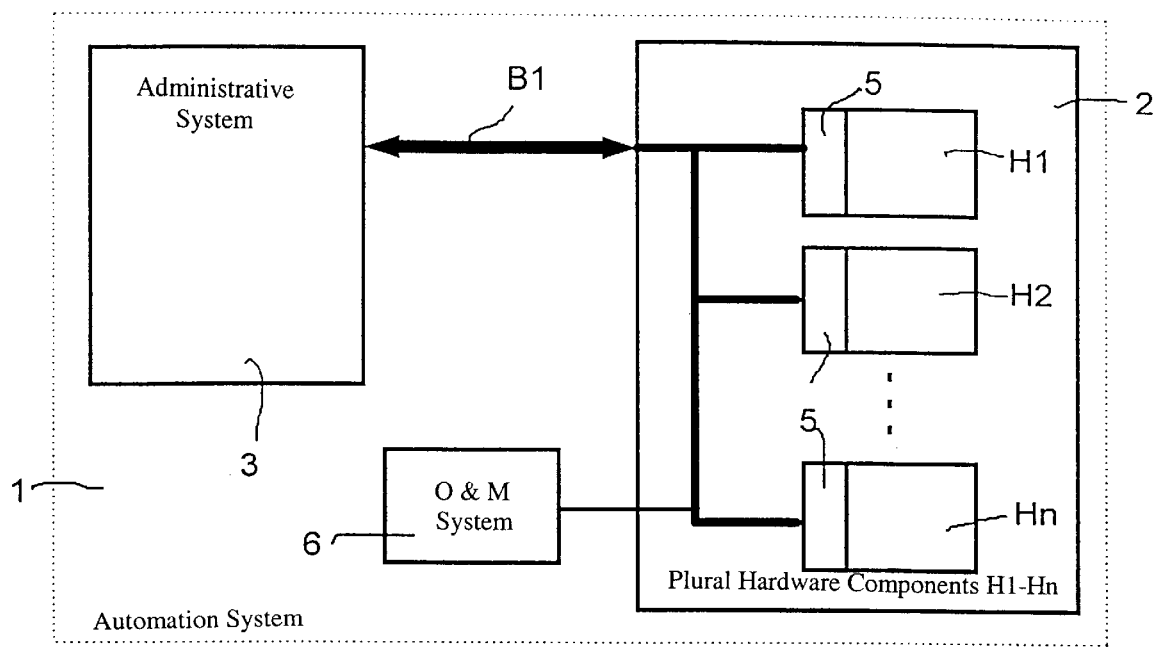
FIG. 1 shows a block diagram of a first embodiment of the present invention having an automation system with distributed objects.

FIG. 1 shows a block diagram of an automation system 1 according to a first embodiment of the present invention. The automation system 1 comprises an administrative system 3, which is connected to a plurality of hardware components H1 . . . Hn via a bus system B1. An operating and monitoring system 6 is also linked to the bus system B1. Each hardware component H1 . . . Hn is provided with a system connection unit 5, each of which is linked to the bus system B1.

The central component of the automation system 1 shown in FIG. 1 is the system connection unit 5, which enables communication of the hardware components H1 . . . Hn within the automation system 1, and which provides a representation of the respective functionality of the hardware components H1 . . . Hn. For these purposes, the system connection unit 5 is provided with a common interface, which contains a pre-determined identification for each of the hardware components H1 . . . Hn, and which allows communication with an external communication partner, for example the superordinate administrative system 3, even without knowledge of the actual hardware components H1 . . . Hn.

Once a communication has been received, the respective communication partner of the hardware components H1 . . . Hn can request more information about respective hardware components H1 . . . Hn via the system connection unit 5. Thus, with the help of the system connection unit 5, it is possible to replace or expand the hardware components H1 . . . Hn without changing the existing structure of the automation system 1. Moreover, because of direct communication between a superordinate administrative system and a system connection unit arranged in the hardware components H1 . . . Hn, it is possible to eliminate the need for intermediately switched abstract layers, which would otherwise be required. Taken together, an automation system including hardware components H1 . . . Hn with an integrated system connection unit 5, as shown in FIG. 1, allows for the system to be open, and flexibly operated. Such an operation will be referred to hereinafter using the phrase "open distributed automation."

Figure 2:
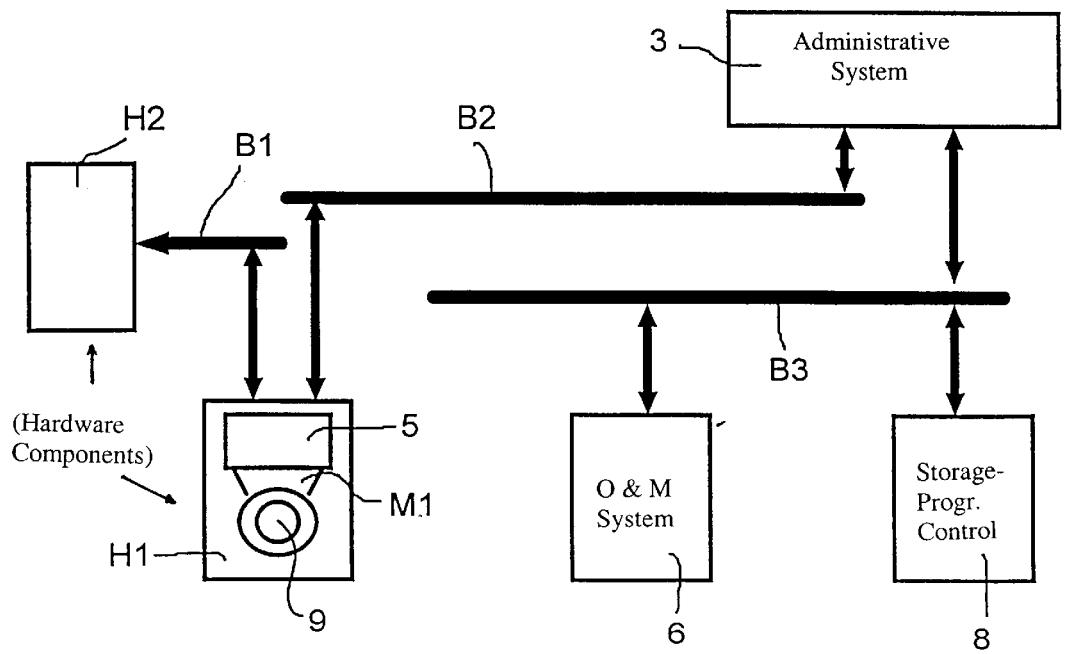
FIG. 2 shows a second embodiment of the present invention of an automation system having several bus systems.

FIG. 2 shows a second embodiment of an automation system of the present invention having several bus systems B1, B2, B3. A hardware component H1 containing a motor M1 and an affiliated signal-processing unit 5 is connected to the first bus system B1. The hardware component H1 is also connected to the second bus system B2, which is interconnected to an administrative system 3. The administrative system 3 can also be connected to the third bus system B3. An operating and monitoring system 6, as well as a storage-programmable control 8, is connected to the third bus system B3.

The hardware component H1, or more specifically the system connection unit 5 of the hardware component H1 with the affiliated signal processing means, is capable of transmitting and receiving communication data via the first B1 and the second B2 bus system. In addition, the system connection unit 5 also forms an interface for a network transition between the first bus system B1 and the second bus system B2, such as, for example, communication data that is to be transmitted from hardware component H2, which is connected to the bus system B1, to the administrative system 3. For this purpose, the system connection unit 5 is provided with a storage device 9 for storing the protocols required for network transition between the bus system B1 and the bus system B2. This facilitates, e.g., a network transition such as between an Ethernet system and a Profibus system. In addition to the advantage of open and distributed communication between the hardware component H1 and, for example, the administrative system 3, the hardware component H1 shown in FIG. 2 also has the advantage of providing an interface adjustment for other hardware components.

Figure 3:
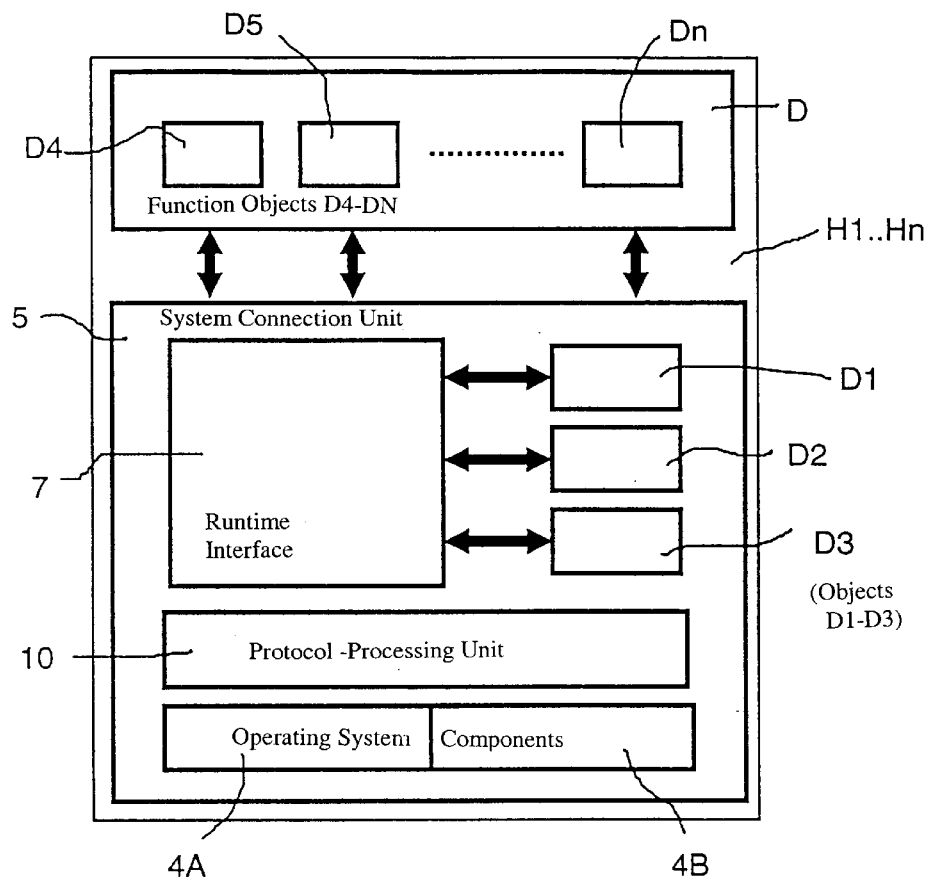
FIG. 3 shows a diagram of the structure of a system connection unit of a hardware component of the present invention.

FIG. 3 shows a diagram of the construction of a system connection unit 5 of a hardware component H1 ... Hn, as it is used, for example, in connection with the exemplary embodiments shown in FIGS. 1 and 2. The signal connection unit 5 contains function objects D1, D2, D3 as well as operating system components 4A, 4B, a runtime system 7, as well as a protocol-processing unit 10 (using, for example, Profibus, UDP/IP, RPC). The hardware components H1 ... Hn are also provided with other data objects D4 ... Dn, which define an additional user functionality as a data object D of a user.

The function objects D1 ... D3 may be designed as so-called DCOM objects (Distributed Component Object Model) or so-called OLE objects (Object Linking and Embedding). The first function object D1 produces a minimal functionality of a hardware component. The second function object D2 is used for interconnecting objects, while the purpose of the third function object D3 is to gather objects located in the system connection unit and/or on remote system processing units, and/or remote computers. The second function object D2 uses the runtime system 7 to produce connections. The runtime system 7 constructs the Remote Procedure Call (RPC) protocol and is an administrative unit overlapped on the RPC protocol, which produces a view of the local or remote objects or interface with the help of the RPC protocols. The special feature of the runtime interface 7 is that the interface 7 is designed to be asynchronous. In other words, after the return of the corresponding function, the results that are to be delivered from a remote system are not yet available.

The activator, i.e., the trigger of the Remote Procedure Call, must therefore transmit the address of a variable to the runtime system 7. When the results arrive, or when a pre-determined time-out is reached, the runtime system 7 changes the value of a certain receipt component. In this way, the trigger is informed whether the operation was completed successfully or whether there was an error. The advantage of the asynchronicity of the runtime system's function interface in the second data object D2 is, for example, that in the case of a cyclic storage-programmable control with a strict cycle, the pre-determined cycle can be maintained. For this purpose, the user program in any cycle activates the method of a local or remote object, while the result of the activation is called up by a flag in the next cycle.

With the help of a certain function, i.e., a command, an interface visible in the runtime system 7 registers the hardware components H1 ... Hn. The registered interface can then be accessed by so-called "clients." Future calls by such clients are transferred by the runtime system 7 to the previously delivered function.

The system connection unit 5 contains a means of conversion from computer information data and data to a communication medium. In this context, the respective data object D1 ... Dn itself is responsible for such a conversion, i.e., for the so-called marshalling. The data objects D1 ... Dn would have to fill a buffer with values for the encoding rules of RPC or DCOM, for example, before the activation of a remote method, corresponding to the parameter signature of the respective method. The same applies for the return of the out-parameters, the receipt of the in-parameters, and the receipt of out-parameters.

The DCOM runtime system 7 makes available functions for the marshalling of individual values. The DCOM runtime system 7 produces the connections between objects on different computers. For this task, a list of interfaces on remote computers used by local clients is maintained (so-called imported interfaces). Also, lists of interfaces are maintained that local servers make available to remote clients (so-called exported interfaces).

Figure 4:
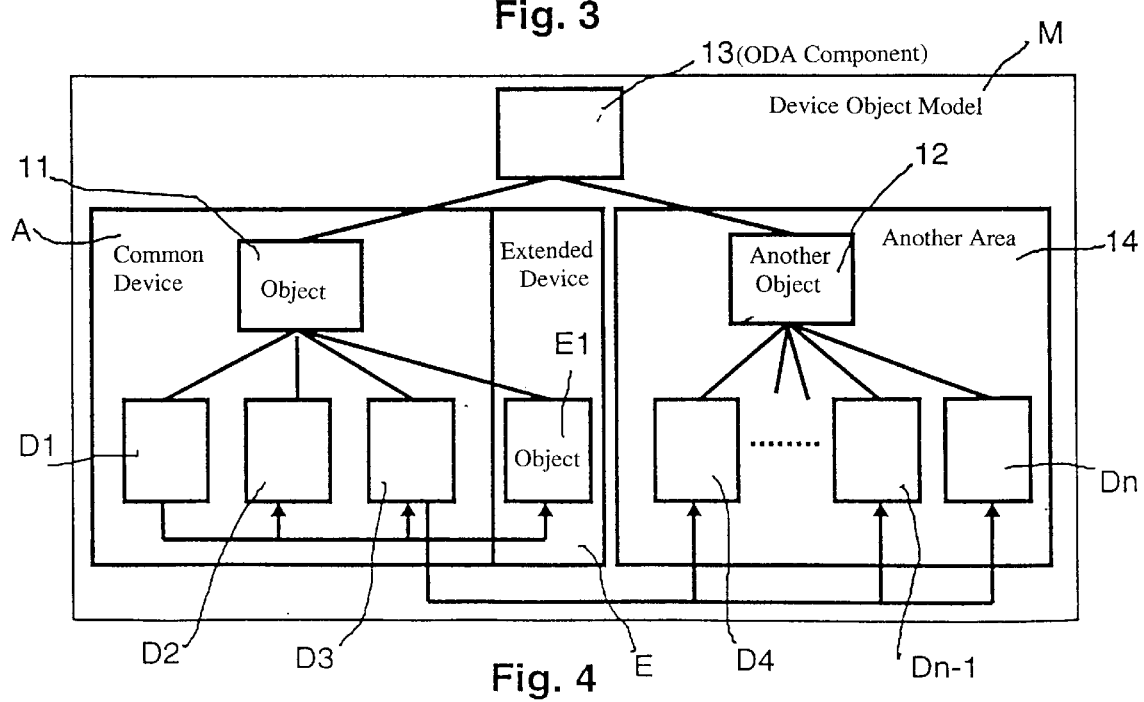
FIG. 4 shows an abstract device object model.

FIG. 4 shows an abstract device object model M for all Open Distributed Automation (ODA) components 13 participating in an open distributed automation system. The device object model M comprises a common device A, which, as a systems definition, describes the functionality of an ODA device, which is the same over all of the devices. The common device A is comprised of the three function objects, D1, D2, and D3. The common device A also contains an extended device E, which describes all services of the device that provide a certain device class, for example a certain type of device of storage-programmable controls, in addition to the general object model A. Descriptions are made via an object E1 (extended device). The device object model M also contains another area 14 for the user functionality assigned to an ODA component 13. In this context, the user functionality of the automation object 13 can be described via another object 12, for example, an Active Control Application Object (ACAO) interface. Interfaces to the data objects D4 ... Dn are accomplished via the ACAO interface.

The object D1 (Common Device) makes available the general minimal functionality of a device. It has the same well-known identification for all devices and can therefore be spoken to by an external communication partner, even without information about the actual device. The object D1 is, so to speak, an to the anchor for all other objects of the device, i.e., the objects exisiting on the device can be determined via the object D1.

The object D2 (ACCO=Active Control Connection Object) connects automation objects, while the object D3 (RT Automation Object) contains references to the automation objects of the device. The special purpose of the function object D3 consists of enumerating, i.e., ascertaining, the sum of the functionality of the system. The extended device E describes all of the services of the device that provide a certain device class, such as a certain type of device of storage-programmable controls in addition to the common object model A. Descriptions are made via the object extended device E1.

Thus, the device object model in accordance with FIG. 4 is subdivided into a part A with fixed functionality, and a part E with variable functionality. The functionality of the function objects D2, D3 is made accessible via the first function object D1, while any other function objects D4 ... Dn can be carried and made accessible by function object D3. In this context, the functionality of the automation objects can be described via the ACAO interface 12.

A method of the present invention for accessing the functionality of hardware components of an automation system can be recognized in the description of the present invention as described above in relation to FIGS. 1 and 3. In the method of the present invention, hardware components H1 ... Hn are connected via at least one bus system B1, and an identification of the hardware components H1 ... Hn is pre-defined and stored in at least one system connection unit 5. The system connection unit 5 communicates with an external communication partner 3, and the functionalities of the hardware components H1 ... Hn are accessed using function objects D1, D2, D3 (FIG. 3) as images of real hardware functions.

Accordingly, the present invention provides an automation system including hardware components linked via at least one bus system, and a method for accessing the functionality of the hardware components. The system connection unit of the present invention contains function objects as images of the real functionality of the hardware components, whereby function objects, for example, DCOM objects, are provided for accessing the functionality of the hardware components via the bus system.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. An automation system comprising:

at least one bus system;

hardware components connected to said at least one bus system;

a system connection unit provided for at least one of said hardware components, said system connection unit comprising:

a common interface containing a pre-defined identification for each of said hardware components for communication with an external communication partner, and for receiving and transmitting information; and at least one function object based on a software object as an image of a real functionality of said one hardware component, whereby said at least one function object is provided for accessing the real functionality of said one hardware component via said bus system.

2. An automation system in accordance with claim 1, wherein said hardware components comprise motors, sensors, and actuators.

3. An automation system in accordance with claim 1, further comprising an administrative system and an operating and monitoring system for accessing said at least one function object.

4. An automation system in accordance with claim 1, wherein said at least one function object is designed as DCOM objects.

5. An automation system in accordance with claim 1, wherein said at least one function object comprises at least one of a first function object for producing a minimal functionality of one of said hardware components, a second function object for connecting to other function objects, and a third function object for gathering other function objects located in at least one of said system processing unit, remote system connection unit, and remote computers.

6. An automation system in accordance with claim 5, wherein said second function object is provided for influencing connections between said other function objects located on at least one of said remote system processing units and said remote computers.

7. An automation system in accordance with claim 5, wherein a dynamic retrieval object is generated by said third function object when said system connection unit is accessed.

8. An automation system in accordance with claim 1, further comprising a loadable table with encoding rules.

9. An automation system in accordance with claim 1, further comprising an administrative system and an operating and monitoring system for accessing functionalities of the hardware components.

10. A method for accessing the functionality of hardware components of an automation system, comprising:

connecting said hardware components via at least one bus system, at least one of said hardware components containing a system connection unit;

pre-defining an identification for said hardware components, and storing said identification in said at least one system connection unit;

communicating using said at least one system connection unit with an external communication partner; and accessing said functionality of said hardware components via said bus system using at least one function object as an image of real hardware function, wherein said at least one function object is based on a software object and contained in said system connection unit.

11. A method in accordance with claim 10, wherein said functionality of said hardware components comprises functions of at least one of motors, sensors, and actuators.

12. A method in accordance with claim 10, wherein an administrative system and an operating and monitoring system access said at least one function object.

13. A method in accordance with claim 10, wherein said at least one function object is designed as DCOM objects.

14. A method in accordance with claim 10, wherein said at least one function object comprises at least one of a first function object for producing a minimal functionality of one of said hardware components, a second function object for connecting to other function objects, and a third function object for gathering other function objects located in the at least one of said system processing unit, remote system connection unit, and remote computers.

15. A method in accordance with claim 14, wherein said second function object is provided for influencing connections between said other function objects located on at least one of said remote system processing units and said remote computers.

16. A method in accordance with claim 14, wherein a dynamic retrieval object is generated by said third function object when the system connection unit is accessed.

17. A method in accordance with claim 10, further comprising accessing functionalities of the hardware components using an administrative system and an operating and monitoring system.

* * * * *